United States Patent [19]

Dwork et al.

[11] Patent Number: 5,682,470
[45] Date of Patent: Oct. 28, 1997

[54] METHOD AND SYSTEM FOR ACHIEVING COLLECTIVE CONSISTENCY IN DETECTING FAILURES IN A DISTRIBUTED COMPUTING SYSTEM

[75] Inventors: Cynthia Dwork, Palo Alto; Ching-Tien Ho; Hovey Raymond Strong, Jr., both of San Jose, all of Calif.

[73] Assignee: International Business Machines Corporation, Armonk, N.Y.

[21] Appl. No.: 522,651

[22] Filed: Sep. 1, 1995

[51] Int. Cl.$^6$ .................................. G06F 11/00
[52] U.S. Cl. .................. 395/182.1; 395/182.11; 395/182.02; 395/185.1; 395/200.11
[58] Field of Search .................. 395/182.02, 182.09, 395/182.11, 185.01, 185.1, 183.01, 200.11, 200.03, 200.21, 184.01, 185.08, 182.1

[56] References Cited

U.S. PATENT DOCUMENTS

| | | | |
|---|---|---|---|
| 4,055,808 | 10/1977 | Holsinger et al. | 325/67 |
| 4,323,966 | 4/1982 | Whiteside et al. | 364/200 |
| 4,545,011 | 10/1985 | Lyon et al. | 395/183.19 |
| 4,569,015 | 2/1986 | Dolev et al. | 364/200 |
| 4,710,926 | 12/1987 | Brown et al. | 395/182.02 |
| 4,914,657 | 4/1990 | Walter et al. | 364/200 |
| 5,206,952 | 4/1993 | Sundet et al. | 395/725 |
| 5,365,512 | 11/1994 | Combs et al. | 395/182.02 |
| 5,377,322 | 12/1994 | Ogura et al. | 395/200 |
| 5,408,649 | 4/1995 | Beshears et al. | 395/600 |
| 5,436,909 | 7/1995 | Dev et al. | 371/20.1 |
| 5,485,465 | 1/1996 | Liu et al. | 395/182.02 |
| 5,506,955 | 4/1996 | Chen et al. | 395/184.01 |
| 5,513,354 | 4/1996 | Dwork et al. | 395/650 |
| 5,519,830 | 5/1996 | Opoczynski | 395/182.02 |

OTHER PUBLICATIONS

Vaidya et al., "Degradable Agreement in the Presence of Byzantine Faults", Distributed Computig syustems, 1993 Int'l Conf. IEEE, pp.237–244, 1993.

Becker, "Keeping Processes Under Surveillance", Reliable Distributed systems, 1991, 10th Symposium, IEEE, pp. 198–205.

Ng, "Ordered Broadcasts for Large Applications", Reliable Distributed Systems, 1991, 10th Symposium, IEEE, pp.188–197.

Yan et al., "Otimal Agreement Protocol in Malicious Faulty Processors and Faulty Links", IEEE Trans. on Knowledge and Data Eng., 1992, pp. 266–280.

Barborak et al., "Partitioning for Efficient Consensus" System Sciences, 1993 Annual Int'l Conf., IEEE, pp. 438–446, 1993.

(List continued on next page.)

*Primary Examiner*—Robert W. Beausoliel, Jr.
*Assistant Examiner*—Joseph E. Palys
*Attorney, Agent, or Firm*—Khanh Q. Tran; James C. Pintner

[57] ABSTRACT

A method and apparatus are disclosed for achieving collective consistency in the detection and reporting of failures in a distributed computing system having multiple processors. Each processor is capable of being called by a parallel application for system status. Initially, each processor sends the other processors its view on the status of the processors. It then waits for similar views from other processors except those regarded as failed in its own view. If the received views are identical to the view of the processor, the processor returns its view to the parallel application. In a preferred embodiment, if the views are not identical to its view, the processor sets its view to the union of the received views and its current view. The steps are then repeated. Alternately, the steps are repeated if the processor does not have information that each of the processors not regarded as failed in its view forms an identical union view. In another preferred embodiment, the method is terminated if a quorum is not formed by the processors which are not regarded as failed. Alternatively, after sending its view, the processor waits for an exit condition. Depending on the exit condition, the processor sets its view to a quorum view and sends a "DECIDE" message to the other processors. In another embodiment, the processor updates its view and the method steps are repeated.

47 Claims, 9 Drawing Sheets

OTHER PUBLICATIONS

Soufi et al. "An O(1) Quorem C Onsensus Protocol Tailored for TEH Client/Server Architecture", Reliable Distributed systems, 1993 12th Symposium, IEEE, pp. 98–104, 1993.

D. Malki et al., Uniform Action in Asynchronous Distributed Systems, (Extended Abstract), ACM 0-89791-654-9/94/0008, pp. 274-283.

M. Ben–Or, Another Advantage of Free Choice: Completely Asynchronous Agreement Protocols (Extended Abstract), ACM 0-89791-110-5/83/008/0027, pp. 27-30.

T. D. Chandra et al., The Weakest Failure Detector for Solving Consensus, ACM 0-89791-496-1/92/0008/0147, pp. 147-158.

J. Dongarra et al., MPI: A Message–Passing Interface Standard, University of Tennessee, Knoxville, Tennessee, 1993-1994, pp. 1-11 & pp. 90-129.

METHOD AND SYSTEM FOR ACHIEVING COLLECTIVE CONSISTENCY IN DETECTING FAILURES IN A DISTRIBUTED COMPUTING SYSTEM

CROSS REFERENCE TO RELATED APPLICATIONS

This application contains material related to the following co-pending U.S. Patent Application, which is commonly assigned with this application: U.S. patent application Ser. No. 07/993,183, filed Dec. 18, 1992 for "FAULT TOLERANT LOAD MANAGEMENT SYSTEM AND METHOD"

FIELD OF THE INVENTION

The present invention generally relates to the field of distributed data processing. More specifically, the invention relates to methods for achieving collective consistency in detecting and reporting failures by processing elements of a distributed computing system.

BACKGROUND OF THE INVENTION

Distributed computing systems, especially those having parallel architectures, employ a plurality of processing elements that operate logically concurrently to perform a single task. The processing elements might be individual processors linked together in a network or a plurality of software instances operating concurrently in a coordinated environment. In the former case, the processors communicate with each other through a network which supports a network protocol. The protocol might be implemented using a combination of hardware and software components. In the latter, the software instances are logically connected together through some communication medium such as an Ethernet network. The software instances are referred to, individually as members, and together as a group.

The processing elements typically communicate with each other by sending and receiving messages or packets through a common interface to collectively perform the task. Such a communication takes place when a processing element makes a collective call at the common interface. The collective call is coordinated among a subset of the processing elements called participants. In many cases, frequently used collective calls are provided in a common communication library such as the industry standard Message Passing Interface. This standard is described in a document titled "MPI: A Message-Passage Interface Standard", published by the University of Tennessee, 1994, (hereinafter, MPI). The communication library provides not only ease in parallel programming, debugging, and portability but also efficiency in the communication processes of the application programs.

One of the problems associated with a collective call environment such as the MPI is that it is not possible to achieve consistency of failure detection by the processing elements. Thus, failure or tardiness of some processing elements may not be consistently detected and reported by the other processing elements. Inconsistency in these reports makes recovery from system failures difficult.

One strategy for minimizing these difficulties involves consensus or agreement protocols. In these protocols, the processing elements come to an agreement, after a number of exchanges of data among them, as to which ones of the elements have failed and those still functioning. The agreement protocols may be synchronous or asynchronous. For synchronous agreement protocols, it is guaranteed that each correctly functioning element reports its decision concerning the operational status of the other elements within a bounded time. A main disadvantage with such protocols is that the assumptions under which they work hold not with certainty, but only with high probability. Thus, they can only guarantee with high probability that all decisions are the same, as opposed to a guaranteed consistency in the detection and reporting of failures.

A class of synchronous agreement protocols assumes a high degree of synchrony in the computation and in the transport layer of the processing elements. For instance, the above referenced U.S. patent application Ser. No. 07/993,183 discloses a method and apparatus for managing tasks in a network of processors. In such a system, the processors exchange views as to which processors have failed and update their views based on the views received from the other processors. After a number of synchronous rounds of exchange, the operational processors reach an eventual agreement as to the status of the processors in the system. A failure in the assumed synchrony would lead to either inconsistency or the problem of "blocking" as described below.

On the other hand, asynchronous agreement protocols typically guarantee that each correctly functioning processor will eventually report the same decision as reported by all other processors. This guarantee is based on the assumptions that messages are eventually delivered and that a failure detection scheme is available to the protocol.

A major disadvantage with some asynchronous agreement protocols is that the assumptions weaken the guarantee to one of only high probability. Other deficiencies of asynchronous agreement protocols are described by T. Chandra et al. in *"The Weakest Failure Detector for Solving Consensus"*, Proceedings of the 11th Annual ACM Symposium on Principles of Distributed Computing, 1992, pp. 147–158.

Other probabilistic protocols achieve asynchronous consensus eventually with certainty. These protocols, however, are very complex and require a high degree of communication overhead. See, for example, *"Another Advantage of Free Choice: Completely Asynchronous Agreement Protocols"*, by M. Ben-Or, Proceedings of the 2nd Annual ACM Symposium on Principles of Distributed Computing, 1983, pp. 27–30, for a disclosure on these protocols.

Another form of weakened consensus requirement in distributed systems is referred to as dynamic uniformity, as described by D. Malki et al. in *"Uniform Actions in Asynchronous Distributed Systems"*, Proceedings of the 13th Annual ACM Symposium on Principles of Distributed Computing, 1994, pp. 274–283. Generally, dynamic uniformity requires that each correctly functioning participant either reaches the same decision as reached by any other participant or is eventually viewed as disabled by others. The main disadvantages with dynamic uniformity protocols are their complexity and possible temporary inconsistency.

Some prior art asynchronous agreement protocols provide failure detection and reporting by the processing elements, but no guarantee for consistency in the detection and reporting. An example of such protocols is described in U.S. Pat. No. 4,323,966, issued to Whiteside et al., and titled *"Operations Controller for a Fault-Tolerant Multiple Computer System"*.

Note that collective consistency is not synonymous with agreement or consensus. Collective consistency may be achieved in the absence of agreement when, for example, some of the correctly functioning processors never return a view, or when disjoint sets of processors return distinct views, each regarding the other set as having failed.

Nevertheless, whether or not agreement is achieved, achieving collective consistency is advantageous because of its simplicity and because it protects the calling application instance from proceeding on the basis of a view of failures that is inconsistent with the views returned to other instances.

Another problem associated with distributed systems, including those having a collective call environment, relates to the ability to promptly detect failures so that work may be reorganized among the remaining operational processing elements. Failures include crash failures of the processing elements, failure by an element to receive packets by a specific deadline, or tardiness by an element to return from a call.

One possible solution to this problem involves "heartbeat" protocols which employ a multiphase timeout associated with each processing element for detecting failures. An example of these protocols is described in U.S. Pat. No. 5,206,952, issued to Sundet et al., and titled "Fault tolerant networking architecture". Typically, each processing element periodically sends out a signal to other elements. When a first element does not receive a signal from a second element for some n periods, the first element detects a failure of the supposedly sending second element. The value of n is the number of phases for the detection scheme. The larger the number of phases, the more accurate the detection, but the longer the delay before an existing failure is detected. Likewise, making the period longer would improve efficiency by minimizing the communication overhead for failure detection, but also lengthens the delay before the failure is found. Thus, there are inherent disadvantages in "heartbeat" methods.

The '966 patent referenced above provides another solution to the problem. The patent discloses a processor controller which includes a fault handler for identifying other processors of the system as faulty based on messages received from them. It sends to other processor controllers messages indicating which other processors it has identified as being faulty. Faults are detected by techniques such as comparing results of the same task executed by two or more processors, using error detection codes, analyzing the scheduling sequence, or using watchdog timers. If it has been determined that a processor is faulty, the results of the faulty processor are discarded by the other processors.

There are disadvantages with the fault detection scheme disclosed in the '966 patent. First, the detection is based on the receipt and identification of erroneous messages from a faulty processor. A crash failure, in which a processor ceases processing and sending messages altogether, is not sufficiently detected. Consequently, pending tasks assigned to the crashed processor are not sufficiently reallocated to operational processors. Also, the system does not tolerate multiple processor failures. If a pending task is assigned to a subset of the processors, then the task is not executed if all of the subset of processors fail, even though other processors can execute the task.

Another problem related to the fault tolerance of a distributed system is referred to as "blocking". Typically, input data to a collective call is packetized and sent to the other processing elements via a transport layer of the common interface. A blocking receive call is issued to the transport layer for all the packets to be received from other elements. In the event that one of the elements fails to send all of its packets to the others, then each element "blocks", or waits forever, for the missing packets. This undesirable condition must then be corrected by a human intervention.

It is therefore desirable to have a method for achieving collective consistency in detecting failures in a distributed system that is simple and without the above disadvantages. In its weakest form, collective consistency requires that whenever two elements of the system give outputs and one does not regard the other as having failed, then the two outputs must be identical. It is also desirable to have a method for detecting and reporting failures in such a system based on a collective consistency protocol and without the shortcomings described above.

SUMMARY OF THE INVENTION

The present invention relates to methods for achieving collective consistency in the detection of failures in a distributed system, and methods for detecting and reporting failures in the system based on a collective consistency protocol.

It is a primary object of the present invention to provide a method for achieving collective consistency in the detection of failures and tardiness of multiple processing elements in a distributed computing system which is simple to implement and has a low communication overhead.

It is also an object of the present invention to provide a method for achieving collective consistency that does not depend on synchrony of the computation and network environment so as to avoid erroneous failure detection and blocking problems.

It is another object of the present invention to provide a method for detecting and reporting failures in a distributed computing system based on a collective consistency protocol. As a result, failures are promptly detected and the problem of blocking of operational processing elements are avoided while maintaining a low communication overhead.

It is yet another object of the present invention to provide a method for detecting failures in a distributed system that can tolerate crash failures of multiple processing elements and continue processing without human interventions.

Finally, it is an object of the present invention to provide a method for reorganizing work to be performed by a distributed system among its surviving processing elements once failed ones are identified using a collective consistency protocol.

The present invention achieves the foregoing and other objects by providing a computer-implementable method for achieving collective consistency among the processors of a distributed computing system in detecting and reporting failures. The failure information is returned to parallel applications which call the processors of the system. The method is performed for each processor and includes the first step of sending, by each processor to the other processors, a view representing the status of other processors. Next, the processor waits for the views from all other processors of the system except those regarded as failed in the local view of the processor. Finally, the processor returns its views to the parallel application if the views it received are all identical to its view.

In a preferred embodiment of the invention, the processor further updates its view to be the same as the union of the received views and its current view if the received views are not identical to its own view. The steps of the method are then iterated. In an alternate preferred embodiment of the invention, upon completing the step of waiting, the processor updates its view to be the same as the union of all the views received and its current view. The processor then determines whether it has information that each of the other processors, not regarded as failed in its union view, forms a union view identical to its union view. If the processor has such information, it returns the union view to the parallel application. Otherwise, the method continues with the method steps being performed again.

In another preferred embodiment, the method has the additional steps of determining whether the processors not regarded as failed in the view of the processor form a quorum and terminating without returning the parallel application if no quorum is formed. The quorum is defined as any element of a previously chosen family of subsets of a set which has the property that any two subsets of the family intersect. In a different embodiment of the invention, the method further includes the step of determining whether the views from the processors forming the quorum are identical to the view of the processor. The processor then updates its view to be the same as the union of the views from the processors forming the quorum and its current view.

In yet another preferred embodiment of the invention, the processor sends its view to the other processors and waits until certain exits conditions are satisfied before deciding whether to return to the parallel application. The first exit condition requires that (i) a group of the processors in the system form a quorum, (ii) the views from these processors are identical, and that (iii) each of the identical views contains the view formed by the processor. Before returning to the parallel application, the processor updates its views to be the same as the identical views and sends a special DECIDE message, including its updated view, to the other processors.

The second exit condition requires that the processor receives a special DECIDE message from one of the other processors and that the message contains a view that includes the processor's own view. The processor then updates its view to the received view and sends a DECIDE message to other processors as in the first case.

Under the third exit condition, the processor has information that a second view formed by another processor contains the view of the processor, and that the second view is the only view that could possibly be held by a quorum. The view of the processor is then updated to be the same as the second view and the method steps are repeated.

The fourth exit condition exists when the processor has information that none of the other processors received identical views from a quorum of the processors. In this case, the view of the processor is updated to be the union of its view and all received views. Next, the method steps are repeated as with the third exit condition.

The present invention further provides a method for detecting and reporting failures among the processors of a distributed computing system in which the processors operate concurrently and communicate with each other by making collective calls at a common interface. First, each processor participating in a call determines a pattern of failures by the other processors to meet certain deadlines. The processor then forms a local view as to which of the processors have failed based on the determined pattern. Finally, the processor exchanges its view with the views of the other processors based on a collective consistency protocol. As a result, the identities of failed processors are consistently detected and reported by each of the processors of the system.

In a preferred embodiment of the invention, the collective consistency protocol is such that if any two processors participating in a call return their views, then the views returned are identical. In another preferred embodiment, the collective consistency protocol is such that if any failure is detected locally by a processor participating in a call and the processor returns from the call, then the failure is reported to the interface.

In an alternate preferred embodiment of the invention, the interface at which the processors make collective calls includes a broadcast medium and the deadlines are those for some of the processors to receive packets sent to the broadcast medium by other processors of the system. Preferably, each processor also associates with each pattern of failures a numerical measure relative to a threshold for receiving packets by the other processors, during the determination of the pattern. In yet another preferred embodiment, the numerical measure is the number of consecutive failures by a processor to meet a certain deadline.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

DESCRIPTION OF THE PREFERRED EMBODIMENTS

The invention will be primarily described in terms of a method for achieving collective consistency in detecting and reporting failures in a distributed computing system. However, persons skilled in the art will recognize that a processor, a process controller, or a distributed computing system, which includes suitable programming means for operating in accordance with the method to be disclosed, also falls within the spirit and scope of the invention. In addition, the invention may also be embodied in a computer program product, i.e., a recording medium such as a diskette. Such a product may be intended, manufactured, or sold for use with a suitable data processing system. Programming means for directing the data processing system, with which the product is to be used, to execute the steps of the method of the invention, is written on the recording medium in a form read by the data processing system.

Figure 1:
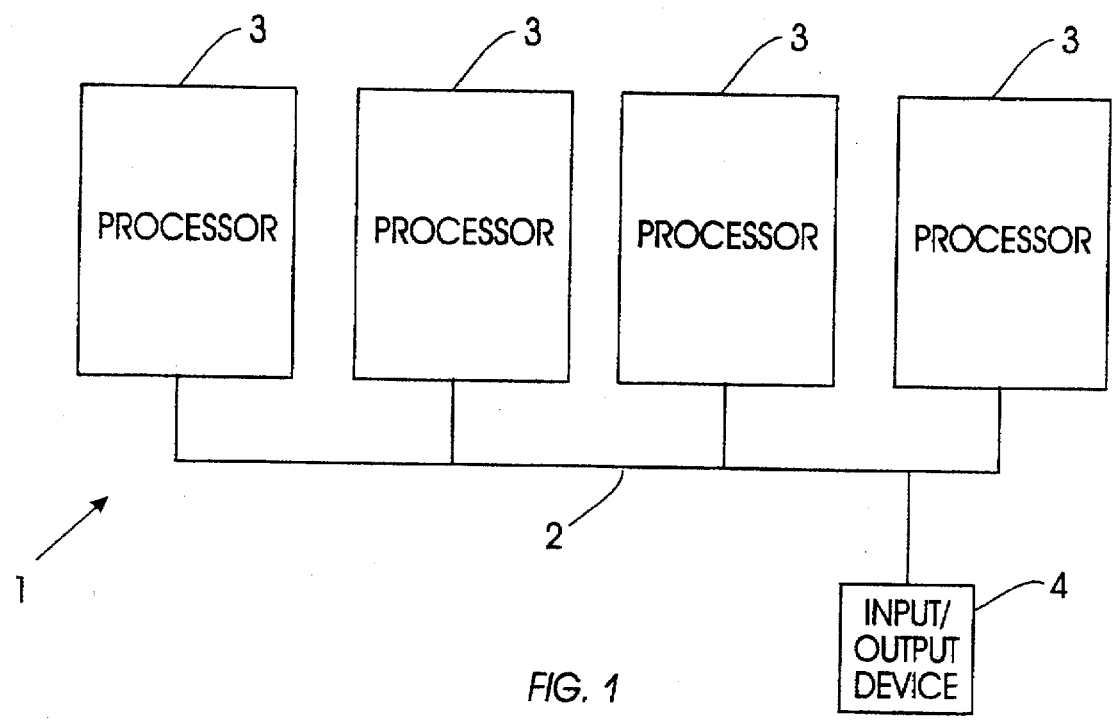
FIG. 1 is a simplified block diagram of a typical distributed computing system including a plurality of processors for executing the methods of the invention.

FIG. 1 is a simplified block diagram of a distributed computing system 1 with which the method of the invention is to be practiced. In FIG. 1 elements a plurality of processing elements or processors 3 are shown, all being connected to a communication interface 2 for communication among themselves. The processors communicate with each other by sending and receiving messages or packets over the communication interface 2. An input/output device 4 schematically represents any suitable apparatus for communicating with the communication interface 2 to provide tasks to be executed by the distributed system 1 and to receive data from the distributed system 1. Examples of an input/output device 4 are display terminals, printers, and data storage devices.

It will be understood that various configurations of distributed data processing systems known to a person of ordinary skill in the art may be used for practicing the method of the invention. Such systems include broadcast networks, such as token-ring networks or Ethernets, distributed database systems and operating systems which consist of autonomous instances of software. In a distributed computing environment, the software instances operate concurrently to perform tasks and are also schematically represented as processors 3 in FIG. 1.

Figure 2:
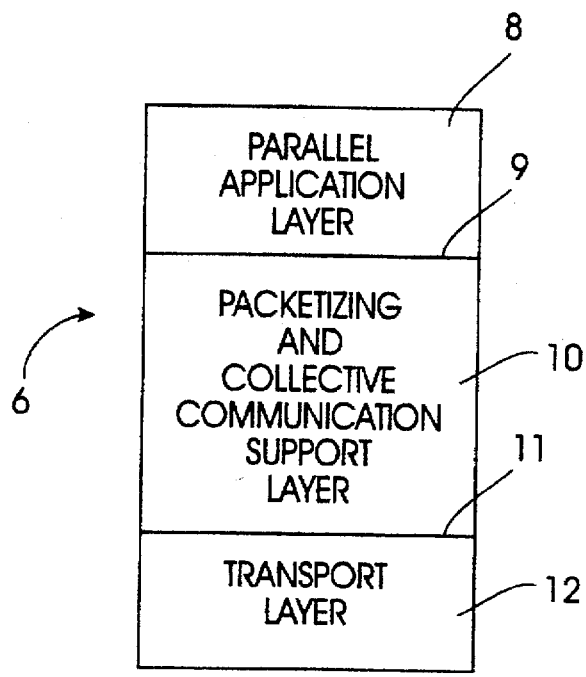
FIG. 2 illustrates the layer structure of a typical prior art software instance operating in a distributed computing system having many of such software instances.

FIG. 2 illustrates the layer structure of a software instance 6 typical of one running in a distributed computing system 1 to which the method of the invention is practiced. The system 1 has many of such instances 6. Generally, each instance 6 includes multiple software layers: a parallel application layer 8, a packetizing and collective communication support layer 10, and a transport layer 12. The parallel application layer 8 communicates with the packetizing and collective communication support layer 10 by making collective calls at a message interface 9. The message interface 9 is located between layers 8 and 10. An example of the message interface 9 is provided in the industry standard Message Passing Interface (MPI). The packetizing and collective communication support layer 10 communicates with the transport layer 12 by sending and receiving packets through a packet interface 11.

In a parallel computing environment, the application layers 8 of the instances 6 operate in parallel to execute a parallel application. Further, software calls at the message interface 9 are coordinated among the instances 6 such that each of the participants in a call can determine in advance how much data it is to receive from the other participants. It is also assumed that any one of the instances 6 may suffer a failure at any time. A failure may be a crash or a failure by the instance to meet a certain deadline such as a deadline to receive a packet from another instance. It is also assumed that the communication interface 2 has sufficient connectivity such that, regardless of failures other than those of the interface 2, any two operating software instances 6 can communicate through the communication interface 2.

Figure 3:
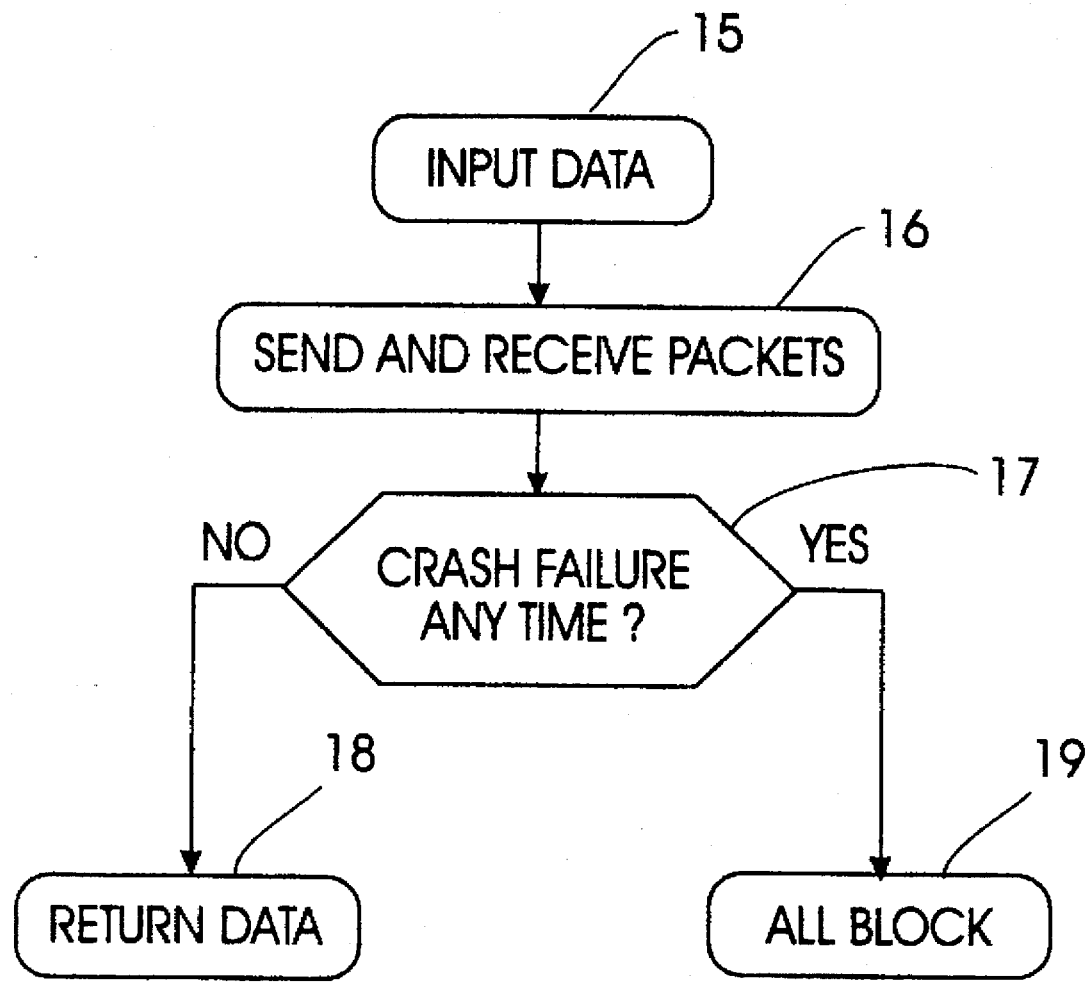
FIG. 3 is a flowchart showing the operation of a typical prior art distributed computing system without collective consistency of failure detection among the processors.

Given these conditions, FIG. 3 illustrates in flowchart form, the operation of a typical prior art distributed computing system 1 that does not include the method for achieving collective consistency of failure detection. In step 15, input data is sent to the distributed system 1 through the input/output device 4 for processing. During processing, the parallel application layers 8 send and receive data packets through the message interface 9, as shown by step 16. In step 17, if an instance 6 of the system has crashed, the other instances 6 are blocked from receiving data from the crashed instance according to step 19, i.e., each remaining parallel application layer 8 issues a "blocking receive" call to the message interface 9. Otherwise, the data of the packetizing and collective communication support layer 10 of each instance 6 is returned to the corresponding parallel application layer 8 of the instance through the message interface 9, according to step 18.

Figure 4:
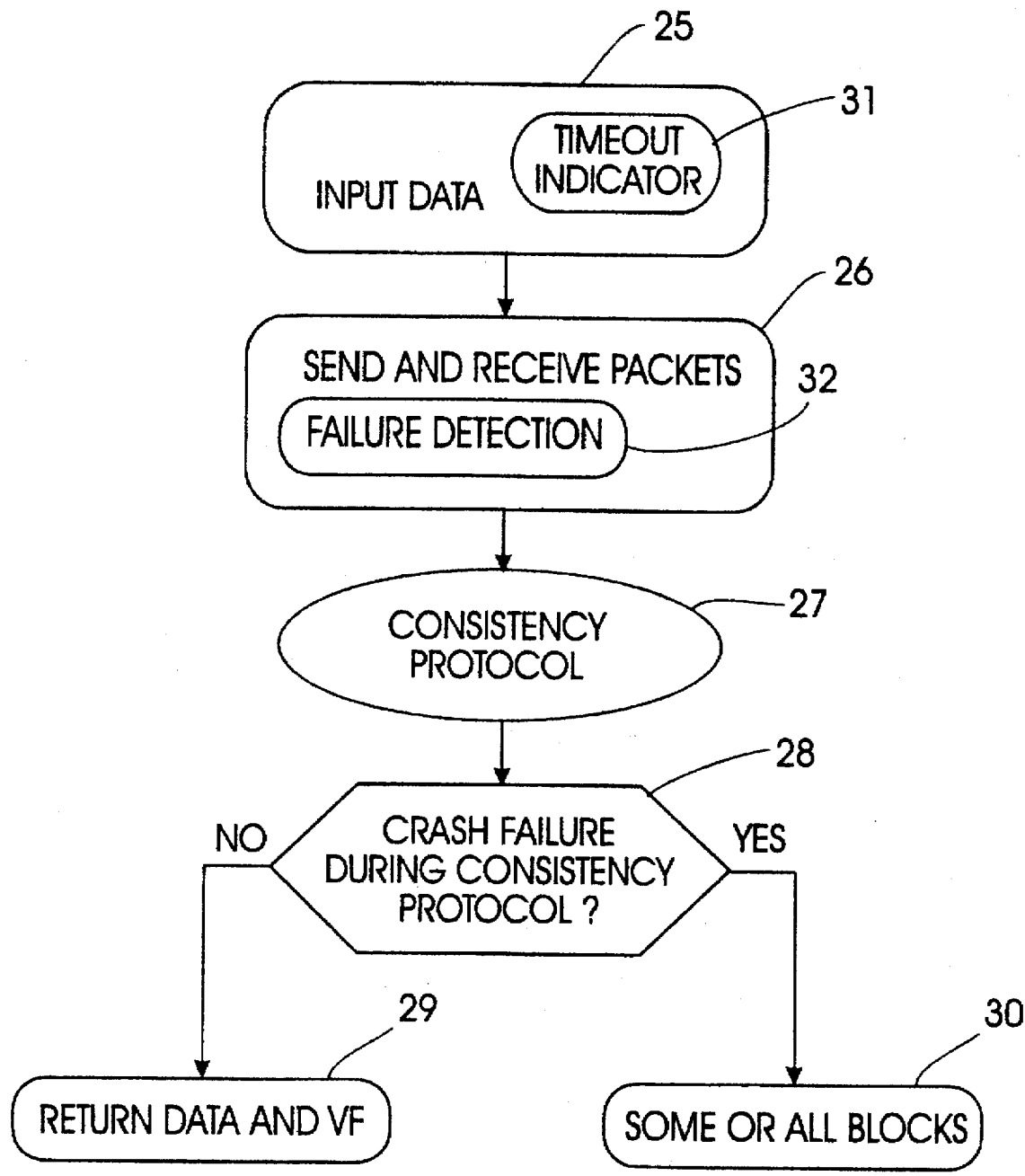
FIG. 4 is a flowchart showing the operation of a distributed computing system in which the method for achieving collective consistency of failure detection of the present invention is practiced.

FIG. 4 illustrates, in the form of a flowchart, the operation of a distributed computing system 1 in which the methods for achieving collective consistency and failure detection of the present invention are practiced. In step 25, in addition to the input data being sent to the distributed system 1 for processing, a timeout indicator 31 is provided. In step 26, the system 1 further includes a failure detector 32 based on the timeout indicator 31 for each processor 3. A collective consistency protocol, as described below, is performed in step 27. In step 28, if a crash failure occurs during the collective consistency protocol, then some processors 3 may wait indefinitely, i.e., blocking, without returning from the collective consistency protocol, according to step 30. On the other hand, if no such failure is detected, the packetizing and collective communication support layer 10 returns its data and view on the status of the other processors to the message interface 9, as shown by step 29.

Figure 5:
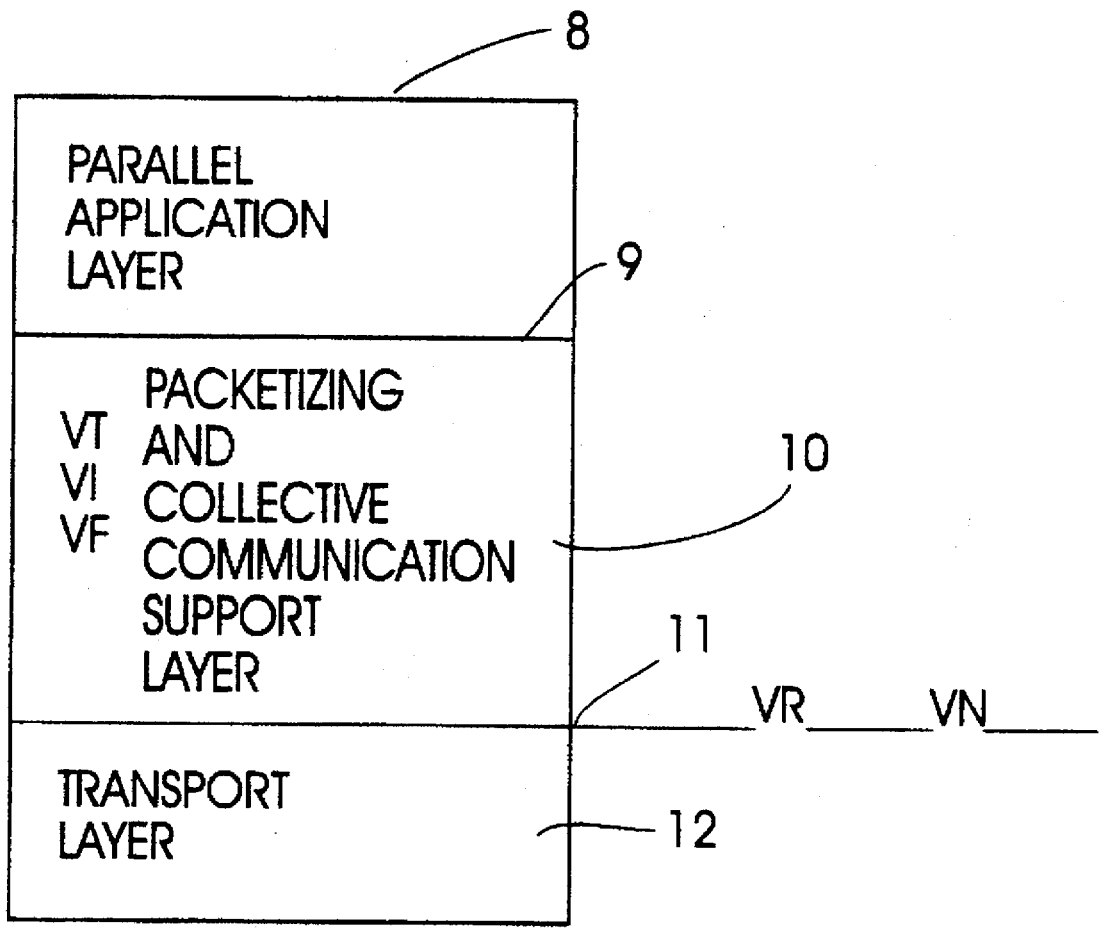
FIG. 5 illustrates the layer structure of a software instance in which new data structures are added to support the operation of the methods of the invention.

Without loss of generality in the type of software structures that might be used to practice the method of the invention, a preferred embodiment for the software structure of a processor 3 used in the invention is illustrated in FIG. 5. The software structure of the prior art processor 3 is extended to include data structures VT, VI, and VF in the packetizing and collective communication support layer 10. Data structure VT specifies the total number of data packets to be received from each instance layer 10 participating in a call at the message interface 9. Data structure V/contains a temporary indication of possible failure for each of the processors, and data structure VF represents the local view of the current set of failures of the processors or as seen by a particular processor i.

Furthermore, the packet interface 11 is extended to include a nonblocking multi-packet receive call. This call takes as input parameters the timeout indicator 31 and new data structures VR and VN. The data structure VR specifies the number of packets to be received from each processor m, typically zero (0) or one (1). The nonblocking multi-packet receive call returns, in addition to the packets requested, the data structure VN which specifies the number of packets requested in VR, but not received by processor i before the timeout. The call returns when it either has all the packets requested or when a duration exceeding the timeout value has expired since the time of the call.

FIGS. 6–9 illustrate, in the form of flowcharts, the preferred embodiments for the method for achieving collective consistency of the present invention. The notation Vx(m) will be used to indicate the value corresponding to processor m in the data structure Vx, where Vx ranges over VR, VN, VT, VI, and VF. The method assures that whatever is returned by a processor i participating in a collective call across the message interface 9 is consistent with that returned by any other processor m, unless the processors regard each other as having failed. Thus, the method provides a Collective Consistency protocol that begins for each processor i immediately after it has received all remaining requested packets, i.e., when it has VT(m)=0 for all m.

The requirements for consistency protocols are enumerated as follows.

1) If $VF_i$ is the view returned by processor i and $VF_j$ is the view returned by processor j, and if j is not in the list of failures of $VF_i$, then $VF_i=VF_j$;
2) If $VF_i$ is the initial view of processor i and processor i returns VF, then $VF_i<VF_j$; and
3) The returned views of the processors are all identical.

A protocol that satisfies the first requirement is said to be a Collective Consistency protocol. When a Collective Consistency protocol satisfies the second requirement, it is referred to as a Monotone Collective Consistency protocol. A Collective Consistency protocol that satisfies the third requirement is called a Strong Collective Consistency protocol.

Figure 6:
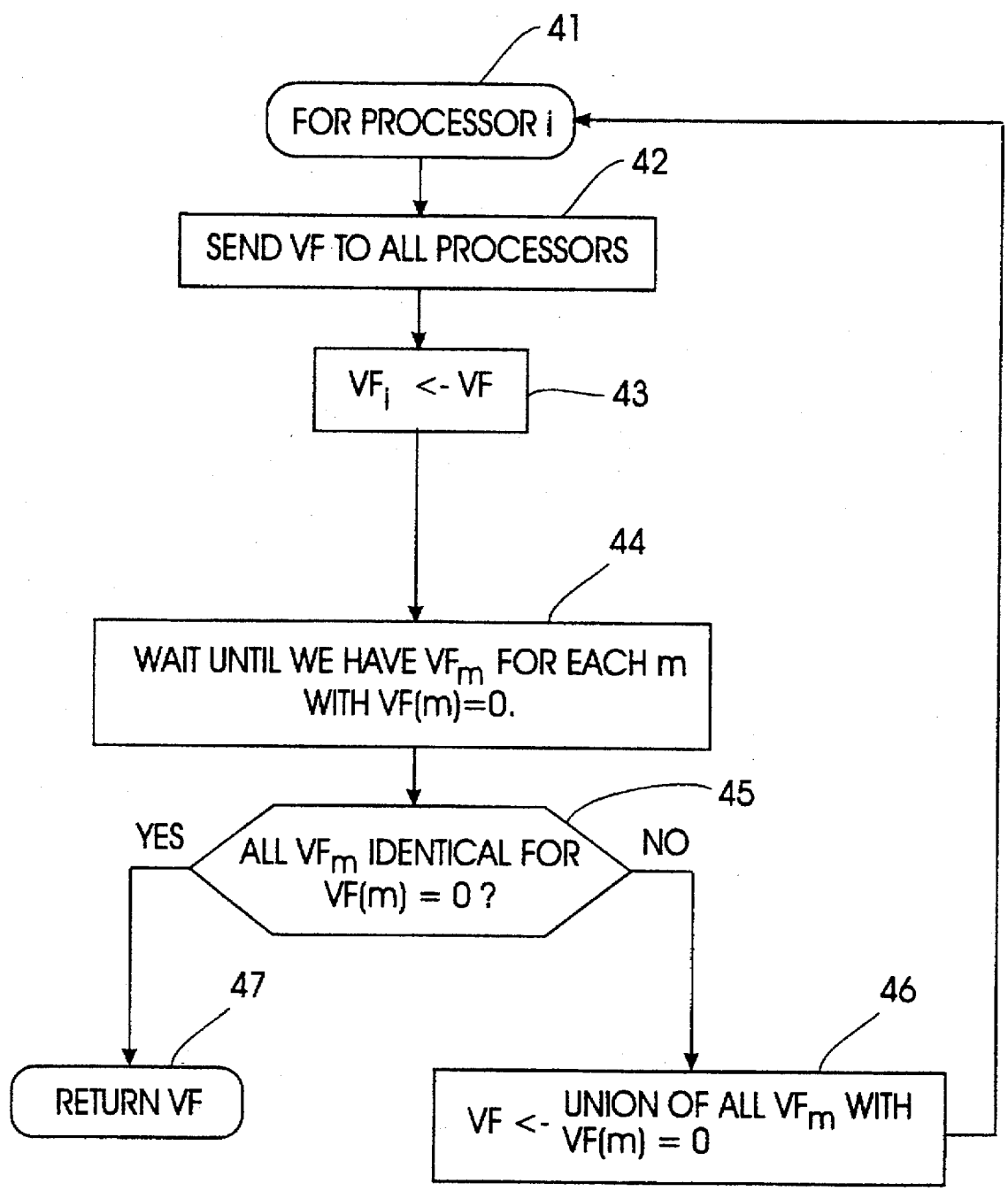
FIG. 6 is a flowchart showing the operation of a preferred embodiment of the method for achieving collective consistency in failure detection of the present invention, based on a Monotone Collective Consistency protocol.

A preferred embodiment of the method for achieving collective consistency based on a Monotone Collective Consistency protocol is illustrated in the flowchart of FIG. 6. The method steps are performed for each processor i participating in the collective call, as indicated by step 41. In step 42, processor i sends its copy of VF to all other participating processors m. Note that it need not send to processors m where VF(m)=1. In step 43 of the method, the view $VF_i$ of processor i regarding the status of other processors is set to VF. In step 44, the processor i issues a blocking multireceive requesting a packet, which should contain $VF_m$, from each processor m with m≠i and VF(m)=0.

According to the method step 45, a determination is made as to whether the views $VF_m$, received by the processor i are all identical to the view $VF_i$ of the processor. If the received views are all identical to the view $VF_i$, then processor i exits the protocol and returns the view VF in addition to the data to be returned across the message interface 9, as indicated by step 47. Otherwise, the view VF of the processor i is set equal to the union of all the views $VF_m$, with VF(m)=0, received by processor i and its current view, as indicated by step 46. Next, the method steps are repeated beginning with step 41, instead of the processor i exiting the protocol.

Figure 7:
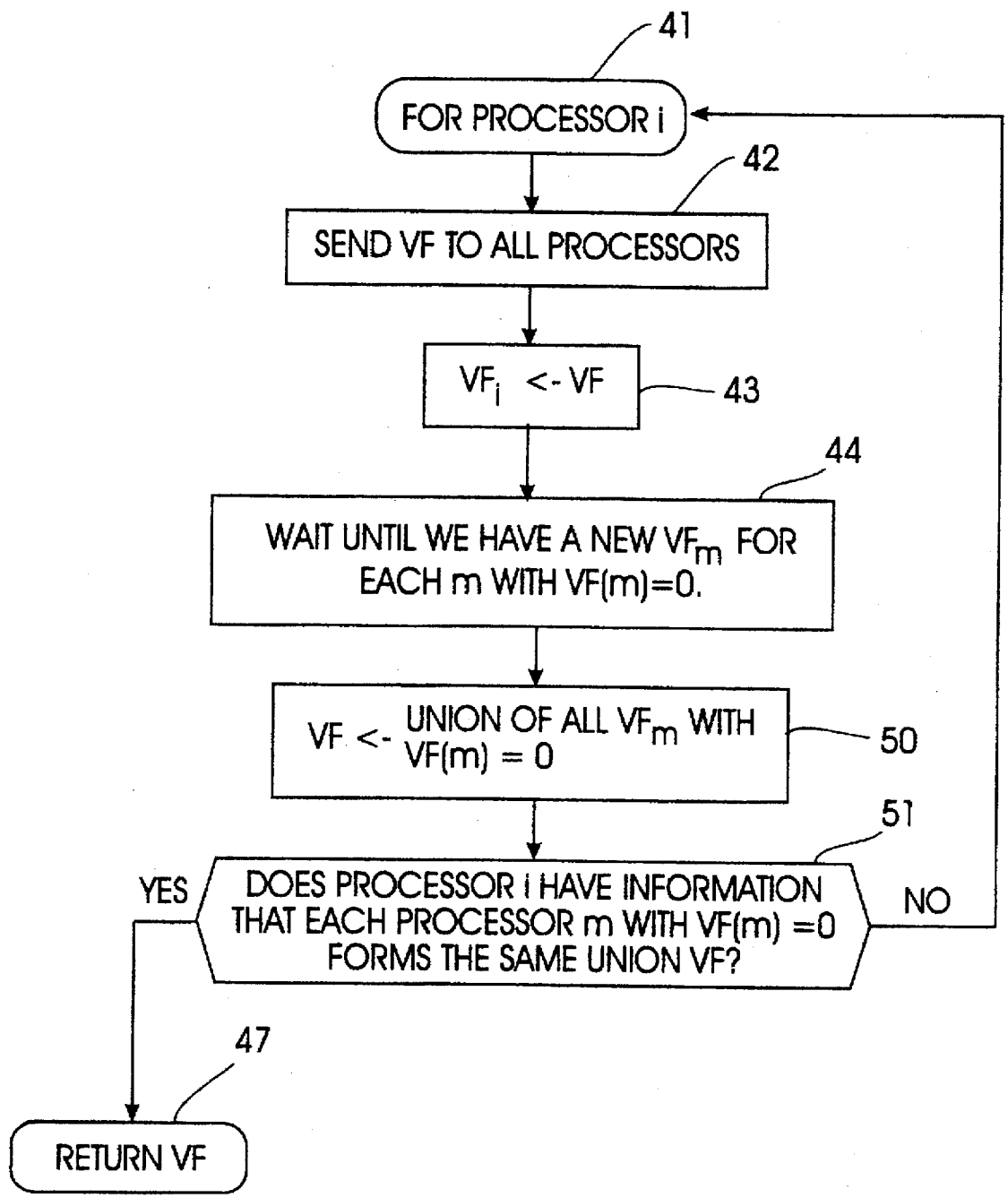
FIG. 7 is a flowchart showing the operation of a preferred embodiment of the method for achieving collective consistency in failure detection of the present invention, based on an alternate Monotone Collective Consistency protocol.

FIG. 7 shows the flowchart for another preferred embodiment of the method for achieving collective consistency based on a Monotone Collective Consistency protocol. This preferred embodiment has the same method steps 41 through 44 as those of the preferred embodiment shown in FIG. 6. In step 50, the view VF of the processor i is updated to be the same as the union of all the views it received and the processor's own view. This operation is described by the notation representing the union of the views from processors or with VF(m)=0. Next, in step 51, processor i determines whether it has sufficient information to conclude that each of the other processors m where VF(m)=0 has or will form a union view identical to the union view formed by processor i. Such union views are formed from similar execution of the step 50 for each processor m. Processors m with VF(m)=0 are those not regarded as failed in the union view formed by processor i.

As an example of the determination performed in step 51, processor i computes for each of the other processors or with VF(m)=0, the union that processor m would have formed from the set of views $VF_j$ with $VF_m(j)=0$. If the processor i has received all the required views $VF_j$, it forms the unions and tests whether they are all identical to its union view VF.

If the required views $VF_j$ are not available or the unions are not all identical to union view VF formed by processor i, the method steps are iteratively repeated beginning with step 41. If the unions are all identical to VF, processor i terminates its participation in the protocol and returns its view VF in addition to the data to be returned across the message interface 9, as indicated by step 47.

Figure 8:
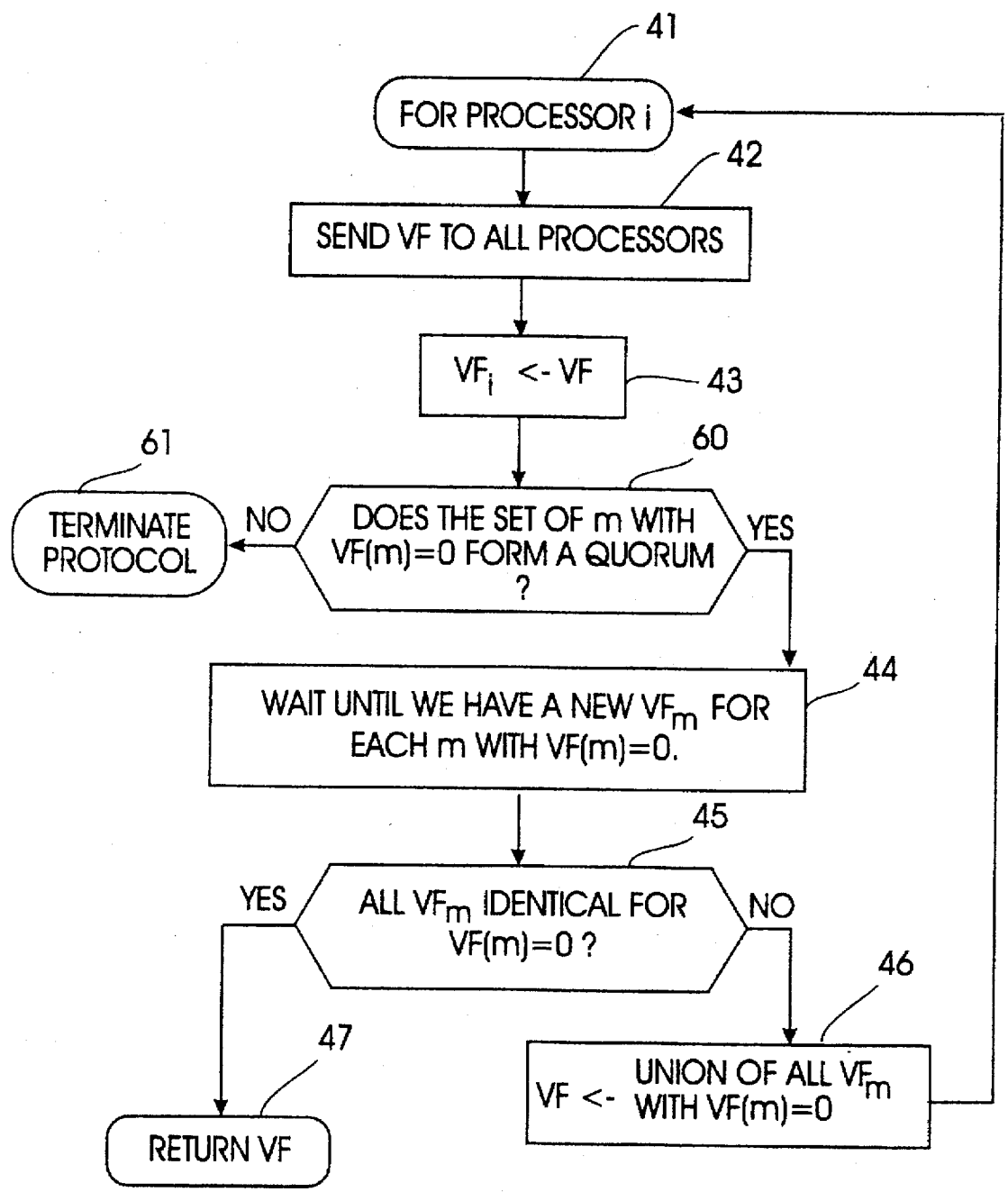
FIG. 8 is a flowchart showing the operation of a preferred embodiment of the method for achieving collective consistency in failure detection of the present invention, based on a Strong Collective Consistency protocol.
Figure 9:
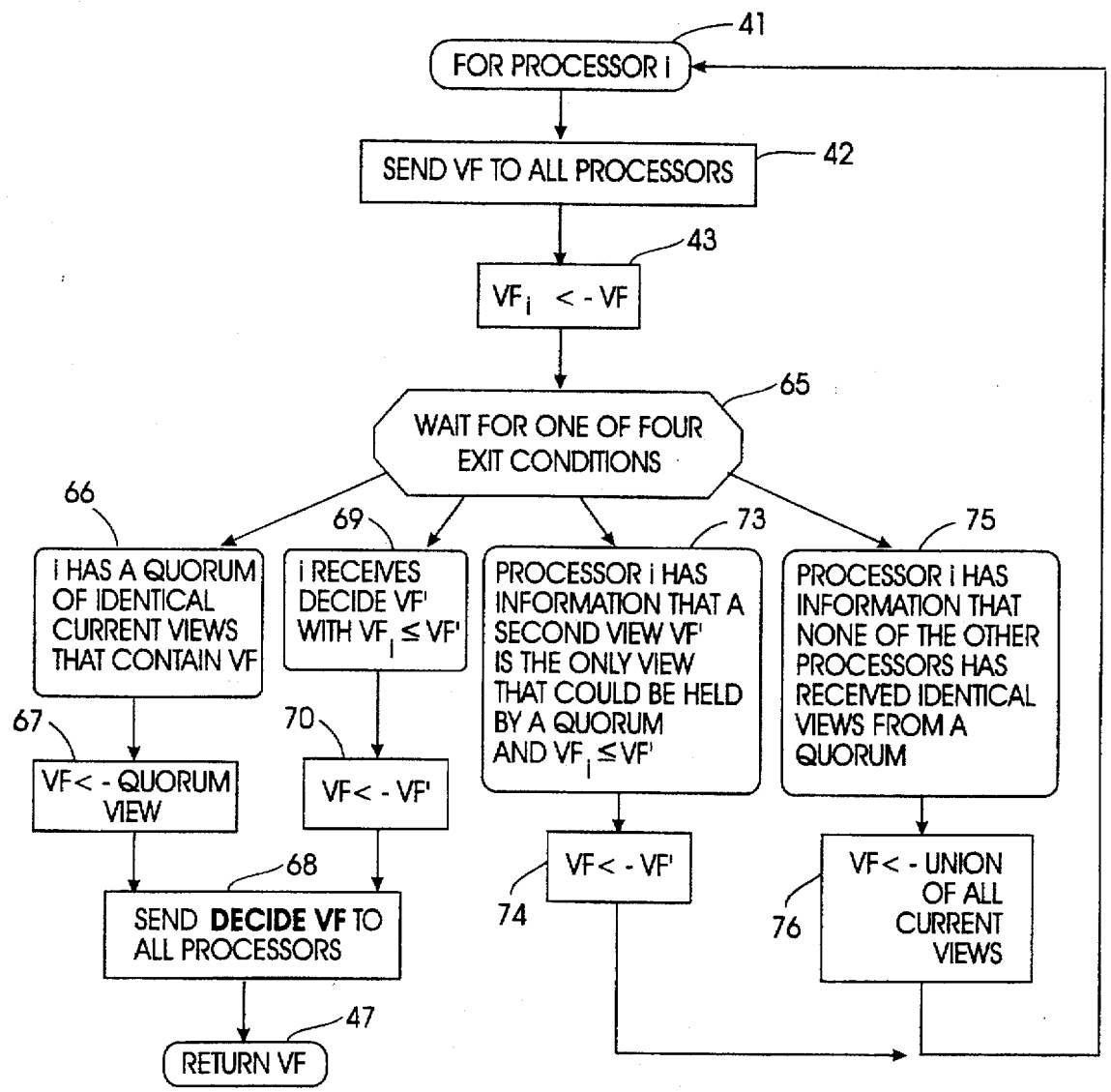
FIG. 9 is a flowchart showing the operation of a preferred embodiment of the method for achieving collective consistency in failure detection of the present invention, based on a Resilient Collective Consistency protocol.

FIGS. 8 and 9 illustrate the flowcharts for alternate preferred embodiments of the method for achieving collective consistency of the invention. In these embodiments, it is assumed that a quorum family has been previously adopted by all the processors participating in the consistency protocol. A quorum family is a family of subsets of the set of participants with the property that any two elements of the family have nonempty intersection. An example of a quorum family is the family of subsets containing a majority of participants. A member of an adopted quorum family will be called a quorum.

Referring to FIG. 8, a preferred embodiment for the method of the invention based on a Strong Monotone Collective Consistency protocol is shown in the form of a flowchart. This embodiment differs from the one illustrated in FIG. 6 only by the addition of steps 60 and 61. Accordingly, following step 43 in which the view $VF_i$ of processor i regarding the status of other processors is set to VF, processor i determines whether those processors not regarded as failed in its view VF form a quorum, according to step 60. The processors not regarded as failed are those processors m having VF(m)=0. As an example of the operation in step 60, processor i determines whether a majority of the processors m had VF(m)=0, assuming the quorum family is the quorum of sets with a majority of the processors. In case the set is not a quorum, the method step 61 is performed in which the processor i terminates its participation in the protocol without returning a view to the message interface 9. If a quorum is formed, processor i proceeds to wait for the receipt of a view $VF_m$ from each of the other processors m with VF(m)=0, according to step 44. The method continues with the execution of steps 45, 46, and 47 which are the same as those described above for the preferred embodiment shown in FIG. 6.

FIG. 9 illustrates the flowchart for an alternate preferred embodiment of the method of the invention based on another Strong Monotone Collective Consistency protocol. In this embodiment, the protocol is referred to as a Resilient Collective Consistency protocol to distinguish it from the other protocols. Referring to FIG. 9, the method steps 41, 42, and 43 are the same as those described above for FIGS. 6 and 8. Briefly, for each processor i, the view VF of the processor is sent to all other processors. Its view $VF_j$ regarding the status of the other processors is set to VF. The processor i then enters a wait mode as shown by step 65. There are four possible exit conditions in which the processor i terminates its wait mode. The first exit condition, illustrated by flowchart block 66, requires that processor i has a set of identical views containing the view VF of the processor i and the views are those of a quorum of the processors. In this case, the view VF of the processor is set to the view of the quorum according to step 67. The processor i next sends a special "DECIDE" message which contains its updated view to all other processors participating in the protocol, per step 68 of the method. Finally, processor i returns its view VF across the message interface 9, according to step 47.

The second exit condition is shown by block 69 of the flowchart of FIG. 9. Under this condition, processor i terminates its wait mode when it receives a special "DECIDE" message from one of the other processors, and the "DECIDE" message includes a view VF' which contains the view VF of processor. In this case, the view VF of processor i is set to the view VF' according to the method step 70. The processor i then sends a special "DECIDE" message with VF to all other processors and returns from the message interface 9 with its view according steps 68 and 47, respectively, similar to the first exit condition.

Still referring the flowchart depicted in FIG. 9, block 73 represents the third exit condition from the waiting step 65 of the method. This condition occurs when the processor i has sufficient information to determine that there is only one view VF' that any processor could possibly have received from a quorum of processors and VF' contains the view of the processor i. According to step 74 of the method, the view VF of processor i is set to be equal to the view VF'. Next, the method continues by repeating the method steps starting with step 41. As an example, assuming the adopted quorum family is the family of majority sets of processors, the processor i would exit step 65 via the condition block 73 if it has received views VF' from exactly half the processors participating in the protocol so that no processor would receive a different view from a quorum of the processors. Next, the view of processor i is updated with view VF'. The method steps are then iterated beginning with step 41.

The fourth exit condition is shown by block 75 of the flowchart of FIG. 9. The condition holds true when the processor i has sufficient information to determine that no participant processor has received identical views from a quorum of processors. In this case, the view VF of the processor i is updated to be the same as the union of all views it received, according to step 76. As a result, the set of failed processors reported in VF is the union of the sets of failed processors reported in all the views received by processor i. The method steps are next repeated starting with step 41, as in the case of the third exit condition. Thus, in step 42, processor i sends its updated view VF before checking again for one of the exit conditions in block 65. For example, if the adopted quorum family is the family of majority sets of processors, processor i would exit the waiting step 65 via condition block 75 if processor i had received pairwise distinct views from two more than half the processors.

Figure 10:
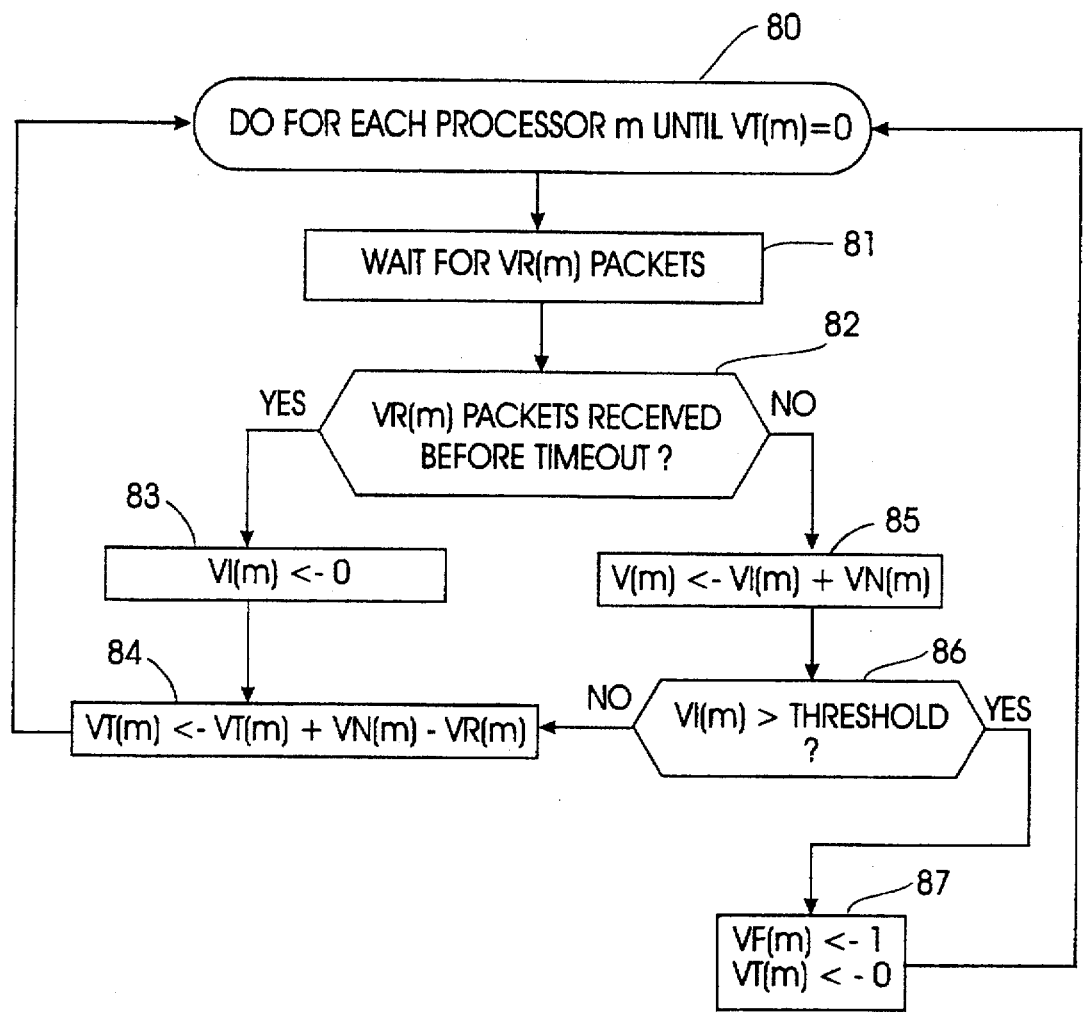
FIG. 10 is a flowchart showing the operation of a preferred embodiment for a Multiphase Packet Oriented Failure Detector of the present invention.

FIG. 10 illustrates in the form of a flowchart, a preferred embodiment for a method for detecting failures in a distributed system to be practiced with the method for achieving collective consistency of the present invention. The embodiment is referred to as a Multiphase Packet Oriented Failure Detector which may be used as a failure detector 32 shown in the flowchart of FIG. 4. Again, the notation Vx(m) is used to indicate the value corresponding to processor from the data structure Vx where Vx ranges over the data structures VR, VN, VT, VI, and VF.

The method steps of the failure detector are performed logically concurrently for each processor 3 of the distributed computing system 1. In summary, the method includes the first step of determining by each processor 3 a pattern of failures by all the processors to meet certain deadlines. In the second step, a local view is established by the processor 3 as to which of the processors have failed, using the determined pattern of failures. Next, the processor 3 exchanges its local view with the views similarly formed by the other processors. The exchange is based on a collective consistency protocol which assures that if any two processors 3 return their views and one processor is not regarded as failed in the view of the other processor, then the two returned views are identical. As a result of performing these method steps, failed processors 3 are consistently detected and reported by all the processors.

In the preferred embodiment illustrated by the flowchart of FIG. 10, the method steps are executed logically concurrently by each processor i for each processor or for which processor i has VT(m)>0. The notation VT(m) represents the total number of data packets to be received by processor i from each of the other processors m. In step 81, a nonblocking multireceive call with input parameter VR is issued. Accordingly, processor/waits until all data packets VR(m) from each processor or are received. In step 82, the method determines whether a certain condition is satisfied before processor i exits the waiting step 81. In a preferred embodiment of the invention, the exit condition is whether all VR(m) packets are received by the processor i before a timeout. In the case of the affirmative branch from step 82, i.e., when VN(m)=0, the corresponding failure indicator VI(m) is set to zero (0), according to step 83. Next, in step 84, the number of packets to be received VT(m) is decremented by the number of requested packets actually received by processor i from processor or, i.e., by the value of VR(m)−VN(m). The method continues with step 80 to begin another round of receiving packets.

In the case of the negative branch from the decision block 82, the failure indicator VI(m) corresponding to processor m is incremented by VN(m) according to step 85. The value of VI(m) is then compared with a threshold for processor i to receive packets from the other processors. In a preferred embodiment, the interface 2 includes a broadcast medium and the threshold is for processor i to receive packets sent to the broadcast medium by the other processors m.

If the failure indicator VI(m) exceeds the threshold, processor i concludes that processor m has either failed or is too slow in its operation. The processor i then sets its view VF(m) to one (1) to indicate that processor or has failed and sets VT(m) to zero (0) to indicate that no further packets are to be requested from processor m. The method continues with step 80 to begin another round of sending and receiving packets. In the case the failure indicator VI(m) does not exceed the threshold, step 84 is performed and the method similarly continues with step 80.

In another preferred embodiment of the method for detecting faults illustrated by flowchart of FIG. 4 and based on the failure detector of FIG. 10, the method further includes the step of reorganizing remaining work to be performed by the distributed system 1 among the still operational processors 3 once failed processors are detected.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A computer-implemented method for achieving collective consistency in detecting failures in a distributed computing system, the system having a plurality of processors participating in a collective call by a parallel application, the method comprising the steps, performed for each processor, of:

sending, by the processor to the other processors, a view representing the status of the other processors, including status as to which of the other processors have failed;

waiting until the processor receives views from all other processors except those regarded as failed in the view of the processor, the views being sent by execution of the step of sending; and returning the view of the processor to the parallel application if the received views are identical to the view of the processor, whereby collective consistency is achieved, collective consistency being a condition which holds whenever it is true that, if any two processors return their views to the parallel application and one of the two processors is not regarded as failed in the view of the other processor, then the two views are identical.

2. The method as recited in claim 1 further comprising the steps, performed immediately before the step of returning if the received views are not identical to the view of the processor, of:

updating the view of the processor to be the same as a union of all the received views and the current view of the processor; and repeating the steps of the method.

3. The method as recited in claim 1 further comprising the steps, performed immediately before the step of returning, of:

updating the view of the processor to be the same as a union of all the received views and the current view of the processor;

determining whether the processor has information that each of the other processors not regarded as failed in the union forms a union identical to the union of the processor; and repeating the steps of the method.

4. The method as recited in claim 2 further comprising the steps, performed immediately after the step of sending, of:

determining whether the processors not regarded as failed in the view of the processor form a quorum, the quorum being any element of a previously chosen plurality of subsets of a set, the subsets having a property that any two of the subsets intersect; and terminating the method without returning to the parallel application if the quorum is not formed.

5. The method as recited in claim 1, wherein the step of waiting is performed until:

a group of the processors form a quorum, the quorum being any element of a previously chosen plurality of subsets of a set, the subsets having a property that any two of the subsets intersect;

the views received from the processors in the quorum are identical; and each of the identical views contains the view of the processor; and the method further comprises the steps, performed immediately before the step of returning, of:

updating the view of the processor to be the same as the identical views; and sending a DECIDE message to all other processors, the message including the updated view of the processor.

6. The method as recited in claim 1, wherein the step of waiting is performed until:

the processor receives a DECIDE message from one of the other processors; and the message has a view which includes the current view of the processor; and the method further comprises the steps, performed immediately after the step of waiting, of:

updating the view of the processor to be the same as the view of the message; and sending a DECIDE message to all other processors, the message including the updated view of the processor.

7. The method as recited in claim 1, wherein the step of waiting is performed until:

the processor has information of a second view that contains the view of the processor, and the second view is the only view that could possibly be held by a quorum, the quorum being any element of a previously chosen plurality of subsets of a set, the subsets having a property that any two of the subsets intersect; and the method further comprises the steps, executed immediately after the step of waiting, of:

updating the view of the processor to be the same as the second view; and repeating the steps of the method.

8. The method as recited in claim 1, wherein the step of waiting is performed until:

the processor has information that none of the other processors received identical views from a group of the processors, the group forming a quorum, the quorum being any element of a previously chosen plurality of subsets of a set, the subsets having a property that any two of the subsets intersect; and the method further comprises the steps, performed immediately after the step of waiting, of:

updating the view of the processor to be the same as a union of the views received and the current view of the processor; and repeating the steps of the method.

9. A computer-implemented method for detecting and reporting failures among a plurality of processors of a distributed computing system, the processors participating in a collective call by a parallel application, the method comprising the steps of:

determining, by each processor of the call, a pattern of failures by the processors to meet a plurality of deadlines;

forming a local view, by the processor, as to which ones of the processors have failed, the local view being based on the pattern; and exchanging the local view with the views of the other processors, the exchange being based on a collective consistency protocol such that if any two processors return their views to the parallel application and one of the two processors is not regarded as failed in the view of the other processor, then the two views are identical, whereby failed ones of the processors are consistently detected and reported by the processors.

10. The method as recited in claim 9, wherein the collective consistency protocol is such that if any two processors participating in a collective call return their views to the parallel application, then the views returned are identical.

11. The method as recited in claim 9, wherein the collective consistency protocol is such that if any failure is detected locally by a processor participating in a collective call and the processor returns to the parallel application, then the failure is reported to the interface.

12. The method as recited in claim 9, wherein the interface includes a broadcast medium and the deadlines are for the processors to receive a plurality of packets from the broadcast medium, the packets being sent to the broadcast medium by the processors.

13. The method as recited in claim 12, wherein the step of determining includes the step of associating with each pattern a numerical measure relative to a threshold for receiving the packets by the processors.

14. The method as recited in claim 13, wherein the numerical measure is a number of consecutive failures by a processor to meet a deadline.

15. The method as recited in claim 9 further comprising the step of reorganizing work to be performed by the distributed computing system among the processors not detected as failed.

16. A processor for use in a distributed computing system of processors, the processors participating in a collective call by a parallel application for status of the distributed system, the processor comprising:

means for sending to the other processors of the distributed system a view of the processor on the status of the other processors, including status as to which of the other processors have failed;

means for waiting until the processor receives the views from all other processors except those regarded as failed in the view of the processor, the views being sent by execution of the step of sending; and means for returning the view of the processor to the parallel application if the received views are identical to the view of the processor, whereby collective consistency is achieved among the processors as to the status of the processors returned to the parallel application, collective consistency being a condition which holds whenever it is true that, if any two processors return their views to the parallel application and one of the two processors is not regarded as failed in the view of the other processor, then the two views are identical.

17. The processor as recited in claim 16 further comprising means for updating the view of the processor to be the same as a union of all the views received and the current view of the processor, if the received views are not identical to the view of the processor.

18. The processor as recited in claim 16 further comprising:

means for updating the view of the processor to be the same as a union of all the views received and the current view of the processor;

means for determining whether the processor has information that each of the other processors not regarded as failed in the union forms a union identical to the union of the processor; and means for repeating the operation of the processor if the processor does not have the information.

19. The processor as recited in claim 17 further comprising:

means for determining whether the processors not regarded as failed in the view of the processor form a quorum, the quorum being any element of a previously chosen plurality of subsets of a set, the subsets having a property that any two of the subsets intersect; and means for terminating without returning to the parallel application if the quorum is not formed, the means for determining the quorum and terminating means operating immediately after the operation of the means for sending.

20. The processor as recited in claim 16, wherein the waiting means operates until:

a group of the processors form a quorum, the quorum being any element of a previously chosen plurality of subsets of a set, the subsets having a property that any two of the subsets intersect;

the views received from the processors in the quorum are identical; and each of the identical views contains the view of the processor; and the processor further comprises:

means for updating the view of the processor to be the same as the identical views; and means for sending a DECIDE message to all other processors, the message including the updated view of the processor.

21. The processor as recited in claim 16, wherein the means for waiting operates until:

the processor receives a DECIDE message from one of the other processors; and the message has a view which includes the current view of the processor; and the processor further comprises:

means for updating the view of the processor to be the same as the view of the message; and means for sending a DECIDE message to all other processors, the message including the updated view of the processor.

22. The processor as recited in claim 16, wherein the means for waiting operates until:

the processor has information of a second view that contains the view of the processor, and the second view is the only view that could possibly be held by a quorum, the quorum being any element of a previously chosen plurality of subsets of a set, the subsets having a property that any two of the subsets intersect; and the processor further comprises:

means for updating the view of the processor to be the same as the second view; and means for repeating the operation of the processor.

23. The processor as recited in claim 16, wherein the waiting means operates until:

the processor has information that none of the other processors received identical views from a group of the processors, the group forming a quorum, the quorum being any element of a previously chosen plurality of subsets of a set, the subsets having a property that any two of the subsets intersect; and the processor further comprises:

means for updating the view of the processor to be the same as a union of the views received and the current view of the processor; and means for repeating the operation of the processor.

24. A processor for use in a distributed computing system of processors, the processors participating in a collective call by a parallel application, the processor comprising:

mean for determining a pattern of failures by the processors to meet a plurality of deadlines;

means for forming a local view as to which ones of the processors have failed, the local view being based on the pattern; and means for exchanging the local view with the views of the other processors, the exchanging means operating according to a collective consistency protocol such that if any two processors participating in the collective call return their views to the parallel application and one of the two processors is not regarded as failed in the view of the other processor, then the two views are identical, whereby failed ones of the processors are consistently detected and reported by the processors.

25. The processor as recited in claim 24, wherein the collective consistency protocol is such that if any two processors participating in the collective call return their views to the parallel application, then the views returned are identical.

26. The processor as recited in claim 24, wherein the collective consistency protocol is such that if any failure is detected locally by a second processor participating in the collective call and the second processor returns to the parallel application, then the failure is reported to the interface by the processor.

27. The processor as recited in claim 24, wherein the interface includes a broadcast medium and the deadlines are for the processors to receive a plurality of packets from the broadcast medium, the packets being sent to the broadcast medium by the processors.

28. The processor as recited in claim 27, wherein the means for determining includes means for associating with the pattern a numerical measure relative to a threshold for receiving the packets by the processors.

29. The processor as recited in claim 28, wherein the numerical measure is a number of consecutive failures by the processors to meet a deadline.

30. A distributed computing system having a plurality of processors participating in a collective call by a parallel application for status of the system, each processor comprising:
means for sending to the other processors of the system a view on the status of the processors, including status as to which of the other processors have failed;
means for waiting until the processor receives views from all other processors except those regarded as failed in the view of the processor, the views being sent by execution of the step of sending; and
means for returning the view of the processor to the parallel application if the received views are identical to the view of the processor,
whereby collective consistency is achieved among the processors as to the status of the processors returned to the parallel application, collective consistency being a condition which holds whenever it is true that, if any two processors return their views to the parallel application and one of the two processors is not regarded as failed in the view of the other processor, then the two views are identical.

31. A distributed computing system having a plurality of processors participating in a collective call by a parallel application each processor comprising:
mean for determining a pattern of failures by the processors to meet a plurality of deadlines;
means for forming a local view as to which ones of the processors have failed, the local view being based on the pattern; and
means for exchanging the local view with the views of the other processors, the exchanging means operating according to a collective consistency protocol such that if any two processors return their views to the parallel application and one of the two processors is not regarded as failed in the view of the other processor, then the two views are identical, whereby failed ones of the processors are consistently detected and reported by the processors.

32. The distributed computing system as recited in claim 31 further comprising means for reorganizing work to be performed by the distributed computing system among the processors not detected as failed.

33. A computer program product for achieving collective consistency in detecting failures in a distributed computing system, the system having a plurality of processors participating in a collective call by a parallel application for status on the processors, the computer program product comprising:
a recording medium;
means, recorded on the recording medium, for instructing each of the processors to perform the steps of:
sending to the other processors a view representing the status of the other processors, including status as to which of the other processors have failed;
waiting until the processor receives the views from all other processors except those regarded as failed in the view of the processor, the views being sent by execution of the step of sending; and
returning the view of the processor to the parallel application if the received views are identical to the view of the processor,
whereby collective consistency is achieved among the processors as to the status of the processors returned to the parallel application, collective consistency being a condition which holds whenever it is true that, if any two processors return their views to the parallel application and one of the two processors is not regarded as failed in the view of the other processor, then the two views are identical.

34. The computer program product as recited in claim 33 further comprising means, recorded on the recording medium, for instructing the processor to perform, immediately before the step of returning if the received views are not identical to the view of the processor, the steps of:
updating the view of the processor to be the same as a union of all the received views and the current view of the processor; and
repeating the steps of the program product.

35. The computer program product as recited in claim 33 further comprising means, recorded on the recording medium, for instructing the processor to perform, immediately before the step of returning, the steps of:
updating the view of the processor to be the same as a union of all the views received and the current view of the processor;
determining whether the processor has information that each of the other processors not regarded as failed in the union forms a union identical to the union of the processor; and
repeating the steps of the program product if the processor does not have the information.

36. The computer program product as recited in claim 34 further comprising means, recorded on the recording medium, for instructing the processor to perform, immediately after the step of sending, the steps of:
determining whether the processors not regarded as failed in the view of the processor form a quorum, the quorum being any element of a previously chosen plurality of subsets of a set, the plurality of subsets having a property that any two elements of the plurality of subsets intersect; and
terminating the method without returning to the parallel application if the quorum is not formed.

37. The computer program product as recited in claim 33, wherein
the step of waiting is performed until:
a group of the processors form a quorum, the quorum being any element of a previously chosen plurality of subsets of a set, the subsets having a property that any two of the subsets intersect;
the views received from the processors in the quorum are identical; and
each of the identical views contains the view of the processor; and the computer program product further comprises means, recorded on the recording medium, for instructing the processor to perform, immediately before the step of returning, the steps of:
updating the view of the processor to be the same as the identical views; and
sending a DECIDE message to all other processors, the message including the updated view of the processor.

38. The computer program product as recited in claim 33, wherein the step of waiting is performed until:
the processor receives a DECIDE message from one of the other processors; and
the message has a view which includes the current view of the processor; and
the computer program product further comprises means, recorded on the recording medium, for instructing the processor to perform, immediately after the step of waiting, the steps of:
updating the view of the processor to be the same as the view of the message; and
sending a DECIDE message to all other processors, the message including the updated view of the processor.

39. The computer program product as recited in claim 33, wherein the step of waiting is performed until:
the processor has information of a second view that contains the view of the processor, and
the second view is the only view that could possibly be held by a quorum, the quorum being any element of a previously chosen plurality of subsets of a set, the plurality of subsets having a property that any two elements of the plurality of subsets intersect; and
the computer program product further comprises means, recorded on the recording medium, for instructing the processor to perform, immediately after the step of waiting, the steps of:
updating the view of processor to be the same as the second view; and
repeating the steps of the program product.

40. The computer program product as recited in claim 33, wherein the step of waiting is performed until:
the processor has information that none of the other processors received identical views from a group of the processors, the group forming a quorum, the quorum being any element of a previously chosen plurality of subsets of a set, the subsets having a property that any two of the subsets intersect; and
the computer program product further comprises means, recorded on the recording medium, for instructing the processor to perform, immediately after the step of waiting, the steps of:
updating the view of the processor to be the same as a union of the views received and the current view of the processor; and
repeating the steps of the program product.

41. A computer program product for detecting and reporting failures in a distributed computing system, the system having a plurality of processors participating in a collective call by a parallel application, the computer program product comprising:
a recording medium;
means, recorded on the recording medium, for instructing each of the processors to perform the steps of:
determining a pattern of failures by the processors to meet a plurality of deadlines;
forming a local view as to which ones of the processors have failed, the local view being based on the pattern; and
exchanging the local view with the views of the other processors, the exchange being based on a collective consistency protocol such that if any two processors return their views to the parallel application and one of the two processors is not regarded as failed in the view of the other processor, then the two views are identical, whereby failed ones of the processors are consistently detected and reported by the processors.

42. The computer program product as recited in claim 41, wherein the collective consistency protocol is such that if any two processors participating in the collective call return their views to the parallel application, then the two views returned are identical.

43. The computer program product as recited in claim 41, wherein the collective consistency protocol is such that if any failure is detected locally by a processor participating in the collective call and the processor returns to the parallel application, then the failure is reported to the interface.

44. The computer program product as recited in claim 41, wherein the interface includes a broadcast medium and the deadlines are for the processors to receive a plurality of packets from the broadcast medium, the packets being sent to the broadcast medium by the processors.

45. The computer program product as recited in claim 44, wherein the means for instructing the processor to perform the step of determining includes means, recorded on the recording medium, for instructing the processor to perform the step of associating with each pattern a numerical measure relative to a threshold for receiving the packets by the processors.

46. The computer program product as recited in claim 45, wherein the numerical measure is a number of consecutive failures by a processor to meet a deadline.

47. The computer program product as recited in claim 41 further comprising means, recorded on the recording medium, for instructing the distributed computing system to reorganize work to be performed by the distributed system among the processors not detected as failed.

* * * * *